Dec. 18, 1962 J. H. COLEMAN 3,068,510

POLYMERIZING METHOD AND APPARATUS

Filed Dec. 14, 1959 6 Sheets-Sheet 1

INVENTOR

JOHN H. COLEMAN

BY Robert C. Schmidt [signature]

ATTORNEY

Dec. 18, 1962 J. H. COLEMAN 3,068,510

POLYMERIZING METHOD AND APPARATUS

Filed Dec. 14, 1959 6 Sheets-Sheet 2

INVENTOR
JOHN H. COLEMAN
BY Robert Schmith
ATTORNEY

INVENTOR
JOHN H. COLEMAN
BY Robert A. Schmitt, Jr.
ATTORNEY

INVENTOR
JOHN H. COLEMAN
BY Robert C. Schmutz Jr.
ATTORNEY

INVENTOR
JOHN H. COLEMAN
BY Robert H. Schwartz, Jr.
ATTORNEY

INVENTOR
JOHN H. COLEMAN
BY Robert Schmitz
ATTORNEY 3,068,510
Patented Dec. 18, 1962

3,068,510

POLYMERIZING METHOD AND APPARATUS

John H. Coleman, New York, N.Y., assignor to Radiation Research Corporation, a corporation of Florida Filed Dec. 14, 1959, Ser. No. 859,219
14 Claims. (Cl. 18—2)

This application is a continuation-in-part of my application Serial No. 790,511 filed February 2, 1959.

This invention relates broadly to new and improved methods and apparatus for the production of polymer film. More specifically, the invention relates to the production, with the aid of a gas discharge, of thin polymer film, especially dielectric film, and of elements and subcomponents supplied with gas-discharged-polymerized dielectric coatings which are useful in the fabrication of devices for storing electrical charge, such as capacitors, transmission lines, and the like.

Extremely thin polymer films can be formed upon a suitable surface by exposing the surface to an atmosphere of gaseous material of low molecular weight and polymerizing a polymer film thereon by means of a glow discharge. There are important advantages, along with unique problems, associated with employing a glow discharge to form such a film from a gaseous substance—as distinguished from the electrostatic deposition of solid or liquid particles, and as distinguished from the use of a discharge to form polymers in bulk rather than as a film—and I have discovered certain novel methods and apparatus which greatly improve the results obtainable and which overcome difficulties which would otherwise impair the effectiveness of the operation.

The teachings of the present invention are applicable to the production of a variety of materials including, among others, the formation of a thin polymer film on a nonconducting surface of a previously formed flexible substrate layer, for example a thicker polymer film, or the formation of a polymer film on a substrate having a conducting surface. The film, after being formed, may remain on the substrate, or in some applications, the substrate may be subsequently removed from the film. Substrates having conducting surfaces upon which a dielectric film has been deposited have particular utility in the fabrication of charge storing devices such as capacitors, etc., by the addition of a second electrode for contacting the film.

One object of the invention is to provide methods and apparatus for producing thin polymer film of extremely uniform thickness.

Another object is to obtain high efficiency of operation, so that a maximum quantity of film may be produced for a given amount of electric power.

Among the difficulties which have been encountered is that there is a heating effect caused by the discharge acting on the charged particles of the gas which become polymerized as a film on the surface of the substrate, and this heat can damage the film or the substrate, or both. One undesirable effect which may be caused by this heating effect is that the film and substrate may have a tendency to curl, and this curling makes the resulting product extremely difficult to handle. Accordingly, another object of the invention is to minimize this tendency to curl, and to prevent other damage to the film resulting from overheating.

In certain embodiments of the invention there are provided a pair of elongate sheet-like substrates, which advance together, in spaced apart, face-to-face relation through a discharge zone containing a gaseous atmosphere of polymerizable film-forming substance, an electric potential difference being applied to the opposed surfaces of the substrates so that, as they advance, a glow discharge occurs between their opposed surfaces, whereby polymer films are formed on each of them simultaneously as they advance and substantially all the deposited film is moved continuously out of the discharge zone. This is superior in many respects to arrangements in which a stationary electrode is employed opposite the surface of a single moving electrode. If a stationary electrode is employed, film accumulates on that electrode, and this may have several undesirable consequences. For example, as the film on the stationary electrode becomes thicker, it provides a greater and greater impedance to the discharge currents. Also, in many cases, it eventually begins to flake off, and this in turn has undesirable consequences.

Another feature of the invention is that it provides means and a method for producing polymer film at a high rate of production, while at the same time maintaining accurate control of the position and nature of the film-forming discharge.

With certain configurations of apparatus, as the substrates advance, while being subjected to a potential difference and to the gaseous atmosphere referred to above, it is possible to obtain discharge effects and film formation in regions where this is not desired, unless provision is made to the contrary. In some modes of operation, the discharge may extend over a considerable area and may be stationary. In other modes of operation, the discharge may be localized, and may, from moment to moment, move from one area to another in an irregular fashion. Particularly if there is irregular movement of the discharge in a direction longitudinal to the direction of motion of substrates, this effect can tend to produce film of non-uniform thickness.

I have found that by controlling the geometry of the paths along which the substrates move, the pressure of the gaseous substance supplied, the voltage existing between one substrate and the other, the current density in the discharge, and the distance separating the substrates, I can eliminate the discharge in undesired regions while obtaining in the desired region a selected one of several available modes of discharge, and can also maximize the rate of film production.

Also, I can prevent overheating and can obtain a film of superior tensile strength by control of the factors referred to above, including particulary the geometry of the paths, and in addition by positively withdrawing heat from the substrate in a prescribed portion of its path, as will be more fully described herein.

In one embodiment, there are provided a pair of opposed, spaced apart rollers, and a pair of elongate substrates are advanced along convergent paths to the region of said rollers, where they respectively engage said rollers in arcuate paths and pass between them, and thereafter pass, along diverging paths, away from the rollers. The pressure of the gaseous film-forming substance and the separation between the substrates between the rollers is so related that, in this region, this separation is greater than the effective mean free path of the gaseous particles and the discharge occurs in the region of minimum electrode separation. In general, I have found that an increase in the pressure increases the efficiency of operation—that is, increases the quantity of film produced per kilowatt hour of power consumed. Accordingly, for the most efficient operation, the pressure is maintained at the highest value consistent with the formation of uniform film having the desired properties. The pressure should, however, be considerably less than the value at which substantial polymerization occurs in the volume between the surfaces of the substrate rather than on the surfaces of the substrate. Such volume polymerization forms solid particles in the space between the substrates which have relatively high molecular weights and which, when attracted to the substrate surface, form a flocculent coating with poor mechanical and electrical properties.

Although the invention is not dependent for its usefulness upon the correctness and sufficiency of the theory now to be advanced, it appears that this increased efficiency results from the formation of relatively low molecular weight polymers in the space between the substrate surfaces and the consequent reduction in the number of electrical charges required for the transport of equivalent weights of deposited material. Thus, when the starting substance is a gaseous monomer the use of increased pressures results in formation of dimers and possibly higher order polymers which are still gaseous and of sufficiently low molecular weight to be ionized and transported in a chemically active state to a participating substrate surface. Once having reached the surface, these units then link up with other units to form a continuous homogeneous, solid film.

Where the substrate being coated consists of or includes a conducting layer, the electric voltage may be applied to that layer by wipers or rollers which engage it at some convenient point along its length. Where the substrate is of non-conducting material, the electric voltage may be applied to the rollers and by them to one side of each substrate, so as to establish the required electric field for forming the film between the two opposing substrate surfaces.

With the particular geometry provided by the apparatus just described, and with control as described herein of the various factors such as pressure, voltage and substrate separation, the discharge may be confined substantially to the region between the rollers, and may be prevented from appearing in other regions.

By careful control of the factors involved, it is also possible to obtain satisfactory operation in various embodiments in which the discharge occurs in regions other than that between a pair of opposed rollers. For example, in some cases, the pressure may be maintained at a value such that, in the region where the substrates are closest together, the effective mean free path of the gaseous particles is large in comparison to the separation between the substrates. In this mode of operation, no discharge occurs in the region of minimum separation of the substrates, but a film-forming discharge occurs in each of two zones, just prior to and just subsequent to that region, where the distance between the substrates is somewhat greater. A number of other embodiments are described herein having various unique advantages, including the prevention of damage to film or substrate by unnecessary heating, the elimination of damage to film and substrate by the application of tension thereto, the forming of films on a substrate followed by the dissolving of the substrate so as to obtain an unsupported film, and other arrangements.

Reference is now made to the drawings in which illustrative embodiments of the invention are shown as follows.

Figures 1, 2:
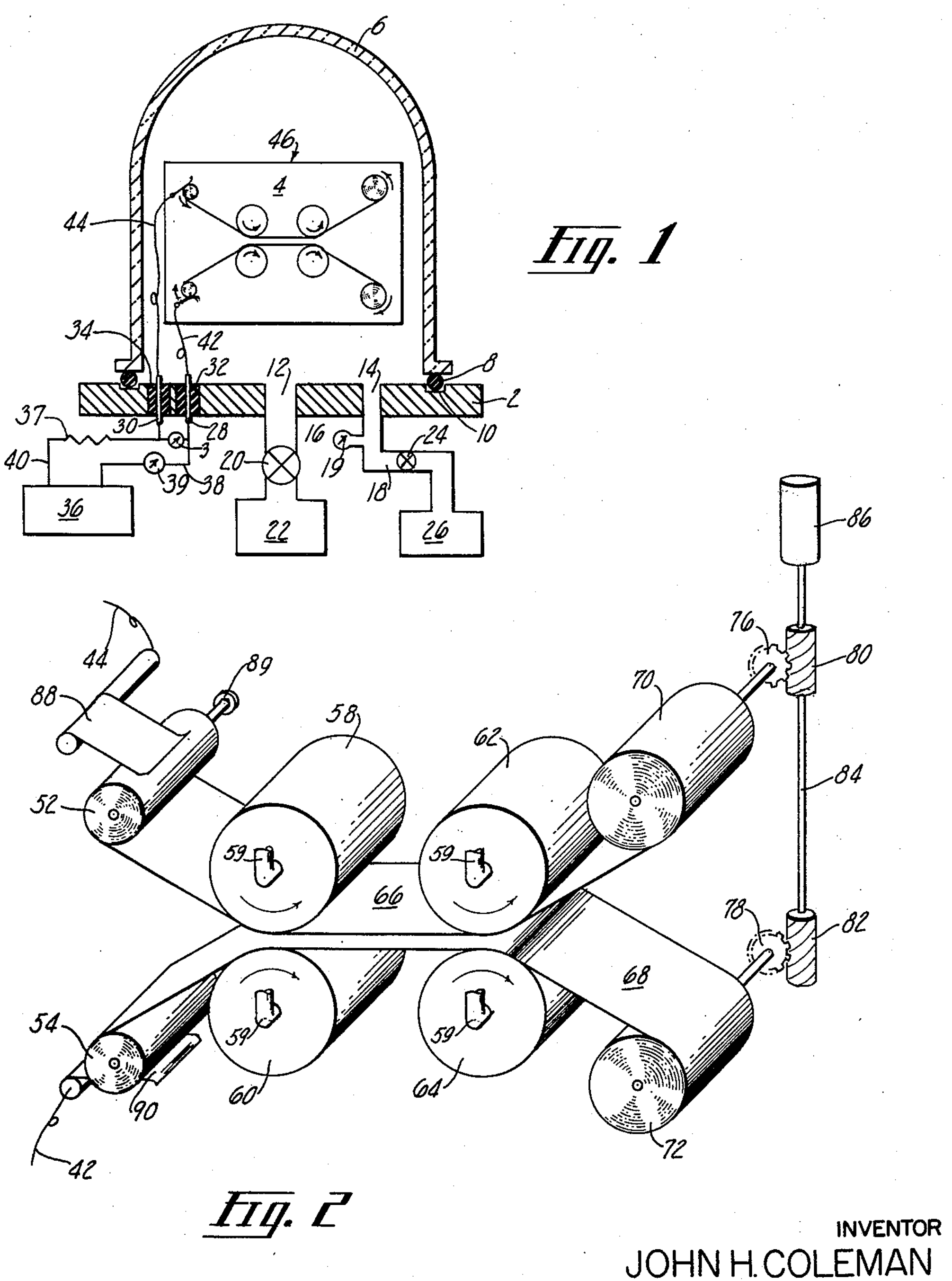
FIG. 1 is a view in partial cross-section of an apparatus suitable for carrying out the teachings of the invention.
FIG. 2 is an enlarged view of the substrate transport system utilized in the apparatus of FIG. 1.
Figure 2A:
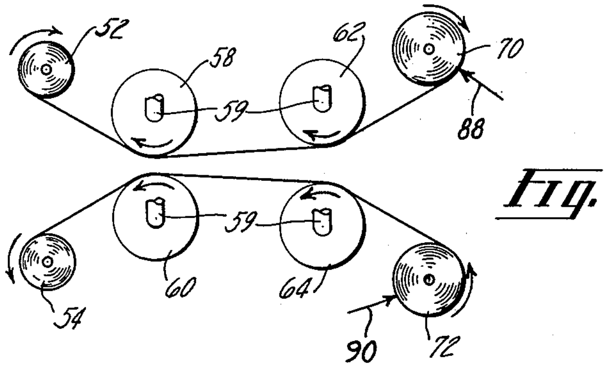
Figure 6A:
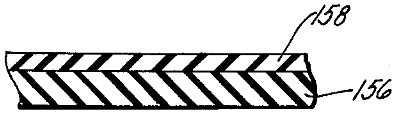
Figure 4:
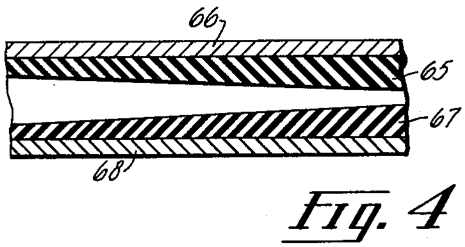
Figure 6:
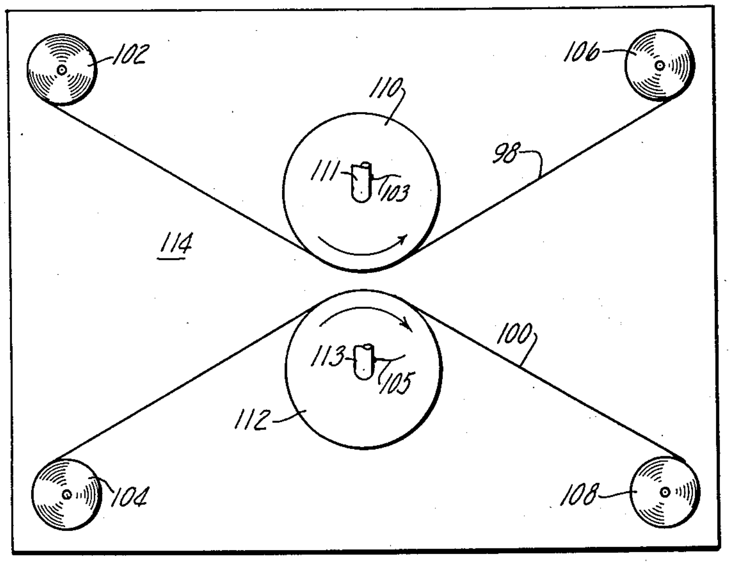
Figure 3:
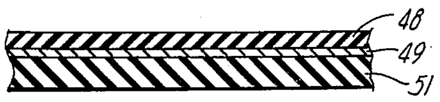
Figures 5, 11:
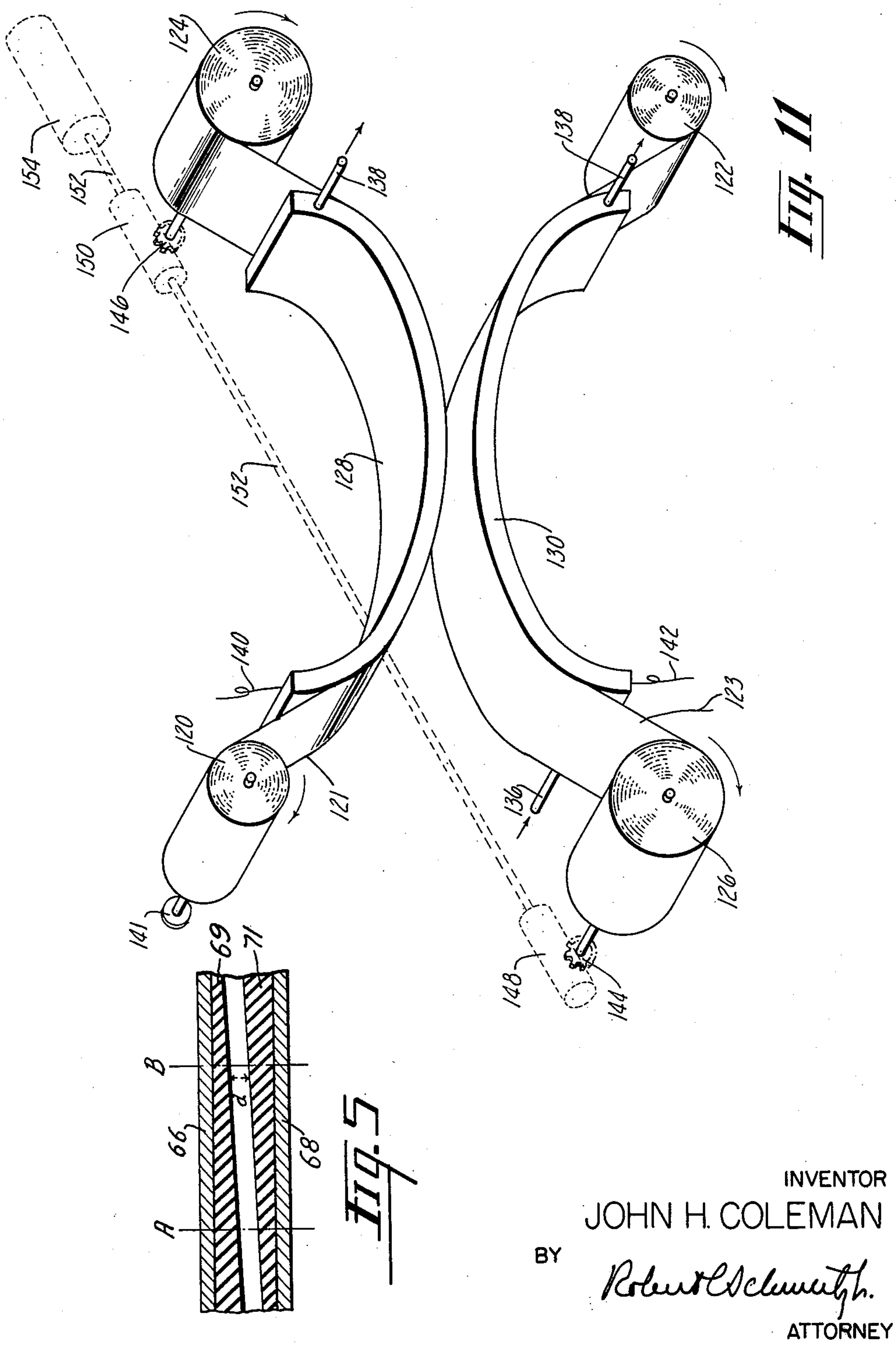

FIG. 2*a* is a schematic view in side elevation of an alternative embodiment of the structure of FIG. 2;

FIG. 3 is a view in cross-section of a metallized, plastic substrate on which a polymer film has been deposited, according to the teachings of the invention;

FIG. 4 is a view in cross-section of portions of two opposed metallic substrates being processed in the apparatus of FIGS. 1 and 2, showing the way in which film thickness is built up;

FIG. 5 is a view like that of FIG. 4, but in which the effect of moving the substrates in opposite directions with respect to each other is shown;

FIG. 6 is a view of an alternate form of substrate transport suitable for use in the apparatus of FIG. 1;

FIG. 6*a* is a view in cross-section of a non-conducting substrate having a film glow discharge polymerized thereon according to the teachings of the invention.

Figures 7, 7A:
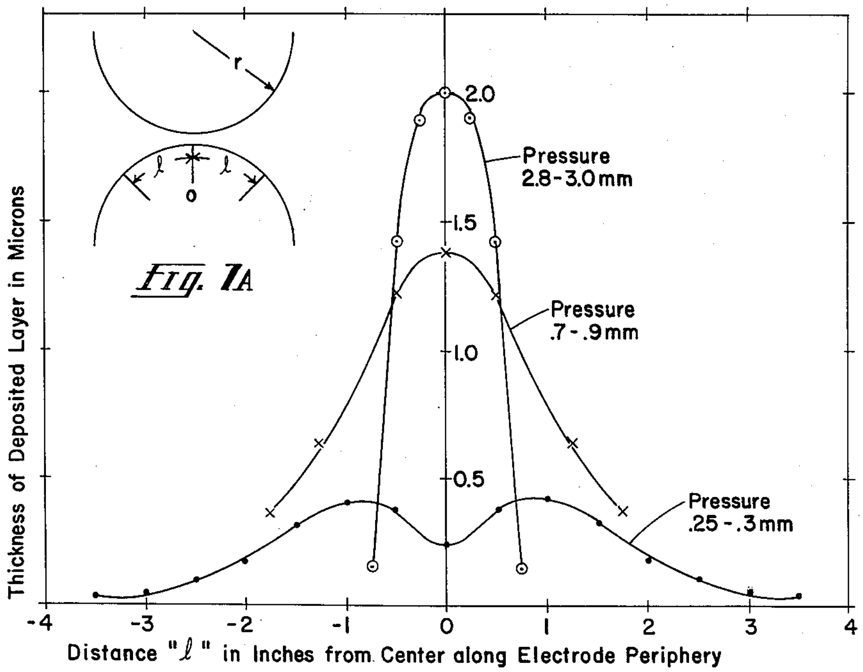
Figure 8:
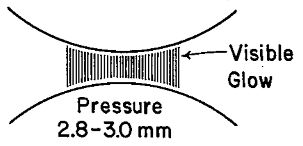
Figure 10:
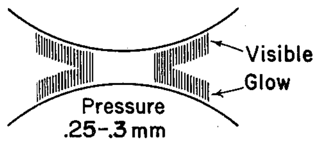
Figure 9:
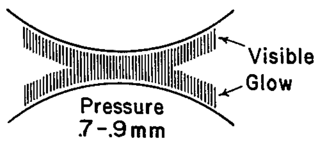

FIG. 7 is a graphical representation of film yield distribution taken at various pressures with the curved plate structure of FIG. 7*a*;

FIG. 7*a* is a schematic representation of an embodiment of the invention showing a pair of convex-facing electrodes;

FIGS. 8, 9 and 10 are views showing the character of the glow discharges obtained at the various pressures of FIG. 7.

FIG. 11 is a view of another embodiment of the invention showing a substrate transport apparatus utilizing stationary convex-facing, substrate guides of the type shown in FIG. 7*a*.

Figure 12:
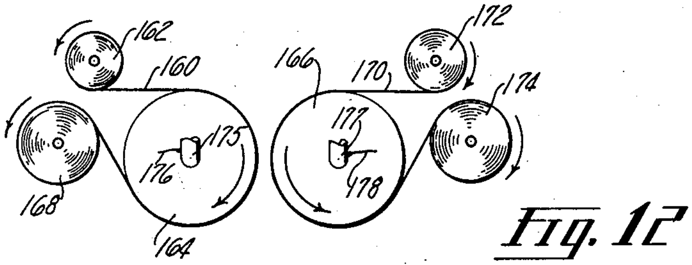
Figure 13:
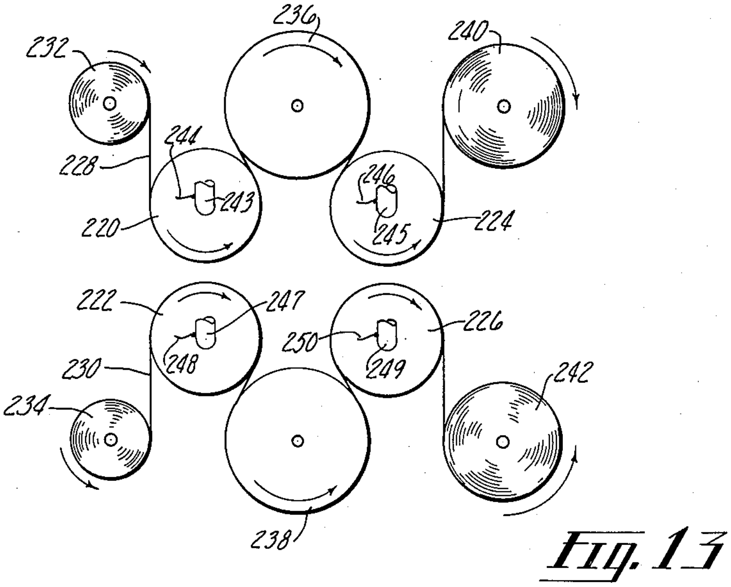
Figure 14:
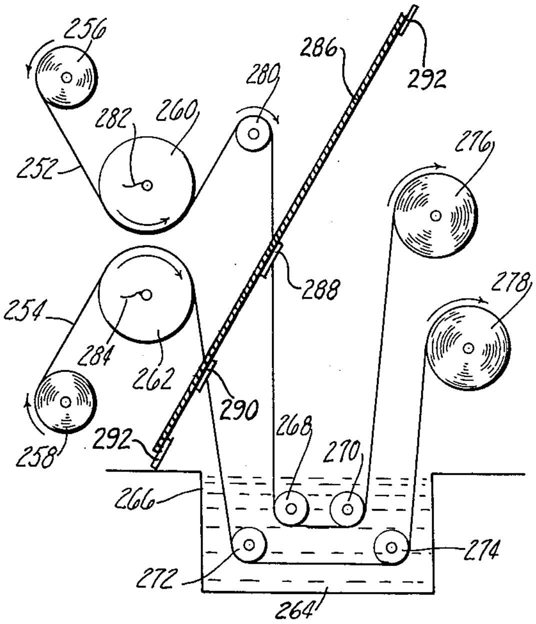

FIG. 12 is a schematic view in side elevation of an embodiment of the invention in which cooling of large substrate areas is accomplished while providing moving supports for the substrates;

FIG. 13 is a schematic view in side elevation of an embodiment of the invention capable of subjecting a pair of substrates to successive polymerizing discharges;

FIG. 14 is a schematic view in side elevation of an embodiment of the invention illustrating production of films upon a pair of substrates and subsequent removal of films from the substrates.

An apparatus which is particularly useful for glow discharge polymerizing thin films on stiff, but flexible substrates having conducting surfaces is illustrated in FIG. 1.

The apparatus includes base plate 2 which serves as a support for substrate transport apparatus support 4 and for surrounding bell jar 6. Bell jar 6 surrounds substrate transport apparatus 46 and rests on O ring 8. O ring 8 is received in annular recess 10 of base plate 2, and hermetically seals the gap between jar 6 and plate 2 to provide an evacuable enclosure. Passages 12 and 14 in base plate 2 are connected with exhaust pipe 16 and starting material supply pipe 18, respectively. Exhaust pipe 16 is connected through valve 20 to vacuum pump 22 and supply pipe 18 is connected through control valve 24 to raw material supply container 26. Valves 20 and 24 may be of the type known as "needle" valves to permit smooth and continuous control of the amount of fluid passing through. Supply container 26 contains the source of gaseous polymerizable substance and may be provided with heating or cooling means (not shown) to assist in regulating vapor pressure. Gauge 19 is attached to supply pipe 18 for monitoring the pressure within the system.

Electrical power for the polymerizing discharge is introduced into the evacuated enclosure by conducting posts 28 and 30 which are hermetically sealed in their passage through the base plate 2 by insulator plugs 32 and 34. External power supply 36 is connected to conducting posts 28 and 30 through series resistor 37 and ammeter 39 by means of siutable connecting wires 38 and 40. Voltmeter 3 is connected between binding posts 28 and 30 to monitor the glow discharge sustaining potential difference. Within the evacuable chamber, power is supplied to the discharge by means of connecting leads 42 and 44 attached to connecting posts 32 and 34. As will be seen, a variety of connecting schemes may be employed, depending upon the configuration of the transport apparatus and the nature of the substrates on which films are being polymerized.

Support 4 may be conveniently made of an electrically insulating material to permit easy isolation of the various parts of the transport apparatus. Other methods of isolation may, of course, be used.

Reference is now made to FIG. 2 where substrate transport apparatus 46 of FIG. 1 may be seen in detail. Substrate transport apparatus 46 has upper and lower transport sections each of which serves to move an elongate, flexible substrate 66 or 68 in and out of the active discharge zone. Substrates 66 and 68 may be solid metal or may comprise a plastic substance having an exposed, electrically conductive surface, both types of structure being useful, for example, in the fabrication of capacitors. Substrates 66 and 68 are unwound from supply spools 52 and 54, respectively, and thence pass along convergent paths to guide rollers 58 and 60. After engaging and passing over the adjacent, opposed surfaces of guide rollers 58 and 60, substrates 66 and 68 travel onto and engage guide rollers 62 and 64, respectively, whence they travel along divergent paths to recovery or take-up spools 70 and 72.

When electrified, as will be seen, the polymerizing discharge is ordinarily formed in the region defined by the minimum gap length or separation between the exposed, oppositely facing surfaces of substrates 66 and 68. In order to insure uniformity of film thickness across the widths of the substrates, the separation of the substrates, while they are in the film forming region, is maintained substantially constant in a direction transverse to the motion of the substrates by maintaining them perpendicular to backing plate 4. The substrates used in this embodiment of the invention must therefore be sufficiently inflexible to remain substantially flat when passing without external support through the discharge region. As will be seen from FIG. 2*a*, the substrate separation in the direction of motion of the substrates between the first pair of rollers 58 and 60 and the second pair of rollers 62 and 64 need not be held constant, since, although the deposition rate will vary longitudinally through the discharge zone, the desired film thicknesses may nevertheless be achieved. The spacing between the substrate surfaces at their point of closest approach to each other in the discharge zone (ordinarily located between the points of flexion of substrates 66 and 68 over the curved surfaces of first rollers 58 and 60 and second rollers 62 and 64) is not critical so long as the distance is less than that which will produce undesirable volume instead of surface polymerization. Spacings of the order of 1.0 centimeter have been found satisfactory.

When depositing polymer films on substrates which may be damaged in some way by heat, or when the films themselves may be damaged by heat, operation of the apparatus of FIG. 2 may be improved by means of a coolant supplied to each roller 58, 60 and 62 and 64 through elbows 59 pivotably mounted on each roller axis. Coolant may thus be supplied, from conventional means (not shown) and removed by means of similar connections (not shown) on the reverse end of each roller drum, and the temperature of the substrates lowered by contact with the roller surfaces both prior to and after passage through the discharge zone.

It will be noted that the substrate surfaces, when they unwind from spools 52 and 54 and are taken up on spools 70 and 72, are much more widely spaced apart than they are while passing through the active discharge zone. These wider spacings are employed in order to insure against the uncontrolled flow of discharge current to these portions of the substrate surfaces. They also serve to provide convenient points of departure for the converging and diverging paths followed by substrates 66 and 68.

A polymerizing gas discharge is produced between the electrode-like surfaces of substrates 66 and 68 by applying a potential difference thereto of the order of 300 to 400 volts or more, depending upon the gaseous, polymerizable substance being used, the operating pressure, the spacing between the electrode surfaces in the film-forming discharge zone, and the desired discharge current density. Connections between the surfaces of substrate 66 and 68 and power supply 36 are shown as being made by means of stud-mounted, flexible contact strips 88 and 90 which contact the conducting substrate surfaces and are connected to internal connecting leads 44 and 42, respectively. This contacting arrangement may be used regardless of whether the substrate 66 and 68 are of solid metal or whether they are made of a plastic substance having an exposed conductive surface. It will be obvious to those skilled in the art that a roller contact may be substituted for the wiping contact structure illustrated to eliminate friction or surface abrasion when these factors are significant. If only solid metal substrates are to be used in the apparatus, contact strips 88 and 89 may be omitted and connections made directly through the spindles of the supply or take-up spools, or through rollers 58, 60 or 62, 64.

A simple drive mechanism is provided which permits delivery of substrates 66 and 68 to the active discharge zone at the same rate. Take-up spools 70 and 72 are driven through spur gears 76 and 78, respectively, which are turned at the same speed by worm gears 80 and 82 on drive shaft 84. Drive shaft 84, which is made of a suitable, electrically non-conductive material to insure electrical isolation of the substrates, is driven by means of variable speed drive motor 86. Drag brakes 89, which may be of the friction or other suitable type, are mounted on the axles of supply spools 52 and 54 to provide the tension necessary to maintain the transverse dimensions of substrates 66 and 68 parallel to each other during passage through the active discharge zone.

In this embodiment of the invention, polymerization of a thin perfluorocarbon dielectric film of uniform thickness upon one surface of each of two substrates is accomplished as follows: with knowledge of the characteristic behavior of glow discharges in the gaseous, polymerizable substance to be employed previously determined by experiment, roller spacings and curvatures are selected which will yield good surface polymerization without undesirable volume polymerization and will permit a range of control over the distribution of the glow discharge polymerizing discharge over the surface to be coated. The transport apparatus is fabricated accordingly. With the essentially parallel substrate surfaces of the structure of FIG. 2, the polymerizing discharge will be conducted at a gaseous pressure at or near the minimum on the Paschen curve so as to insure the spread of glow discharge over the region effectively delimited by the straight edges of the substrates and by the curvature of the substrate surfaces where they pass over rollers 58, 60, 62 and 64.

To produce perfluorocarbon dielectric films upon the surfaces of a pair of 0.0002 inch thick aluminum substrates, the substrates are rolled onto supply spools 52, 54 and their ends are led over rollers 58, 60 and 62, 64 onto take-up spools 70, 72. Bell jar 6 is then placed in position and vacuum pump 22 operated to evacuate the chamber through previously opened valve 22. When a satisfactory vacuum has been achieved, valve 24 is opened and a mixture of monomeric fluorethylenes is admitted from raw material supply container 26. By adjusting valve 20 and 24, a continuous supply of polymerizable substance may be fed to the evacuated chamber, while maintaining the pressure therein at the desired level. Thus, when a minimum separation of 1 centimeter exists between the substrate surfaces, a pressure in a range of about .7 to .9 millimeter of mercury, corresponding approximately to the Paschen minimum, may be maintained by operation of valves 20 and 24. An additional control factor may be exercised when, for example, the gaseous, polymerizable fluorocarbon is derived by pyrolysis of a polymer in supply chamber 26, since the rate of pyrolysis and, consequently, the pressure within chamber 26, may be controlled by controlling the heat supplied thereto.

Polymerizing voltage is then supplied to substrates 66 and 68 through the electrical connections previously described, and the necessary glow discharge sustaining potential difference established between the substrate surfaces. By controlling the pressure of the monomer and the voltage applied to the substrate surfaces, a degree of control over the spread of the glow discharge beyond the parallel surfaces between the rollers may be exercised. With the apparatus operating as just described, the transport apparatus may be actuated to cause motion of the substrates in the same direction onto the take-up rollers.

FIG. 4 is a view in cross-section with scales exaggerated showing the manner in which the deposited polymer films gradually increase in thickness as substrates 66 and 68 are moved together through the discharge zone. Because of the ever-increasing impedance presented to the flow of discharge current by the increasing thicknesses of deposited film, there will be a corresponding change in the rate of film deposition as the film travels through the discharge zone. In the event that more uniform deposition rates are required in the direction of substrate motion, the apparatus of FIG. 2 may be modified to provide for motion of the substrates in opposite directions through the discharge zone, as shown in FIG. 5. With oppositely directed motion of the substrates, the impedance to discharge current flow in any given portion of the discharge region is substantially constant because the sum of the thicknesses of the deposited films at any given point above the substrate path tends to remain constant.

With either mode of operation, e.g. the mode of FIG. 4 or of FIG. 5, the ultimate thickness of the deposited film on each substrate may be controlled by varying the pressure of the gaseous polymerizable substance within the limit specified, by adjusting the voltage applied to the substrate surfaces so as to independently control the current flowing in the discharge, and by varying the rate of motion of the substrate through the discharge zone. In addition, some advantage may be achieved by operating the apparatus at a pressure below the Paschen minimum, as will be described later in connection with FIG. 10. Also, while the use of aluminum substrates has been illustrated above, it will be apparent to those skilled in the art that other conducting substrates or plastic substrates having conductive surface coatings and which possess the requisite transverse rigidity may be employed.

FIG. 2*a* illustrates an alternative form of construction of the embodiment of FIG. 2 in which the spacing between substrate 66 and 68 is varied during their advance along the path between the first set of rollers 62, 64 and the second set of rollers 58, 60.

The rate of convergence of substrates 66 and 68 is less between rollers 62, 64 and 58, 60, however, than the rate of convergence between supply spools 70, 72 and the first pair of rollers 62, 64 and the rate of divergence between the second pair of rollers 58, 60 and take-up spools 52, 54. With these exceptionse and except for relocation of the drive components (not shown) and electrical contacts 88, 90 to accommodate substrate motion in the opposite direction, the structure is otherwise the same as that shown in FIG. 2; for this reason, the same numbering scheme is used. While the spacing between substrates 66 and 68 increases as the substrates pass beyond rollers 62, 64 towards rollers 58, 60, the surfaces of substrates 66 and 68 are maintained substantially parallel to one another in a direction transverse to the direction of substrate motion in order to insure uniformity of coverage of the width of each substrate.

The structure of FIG. 2*a* has the advantage, over the structure of FIG. 2, that flexibility of control over the extent of substrate surface area being subjected to glow discharge of polymerization is greatly increased. As was pointed out in describing FIGS. 2 and 4, some decrease in discharge polymerization rate will result as a consequence of increasing thicknesses of deposited film between the substrate surfaces with increasing residence time of the substrate in the discharge zone. By decreasing the separation between the substrates as they travel through the zone, an increase in discharge current density may be effected, compensating for the film build up and maintaining the desired current density. Thus the structure of FIG. 2*a* is more sensitive to variations in pressure of the gaseous polymerizable substance or the voltage applied between the substrate surfaces and therefore permits a higher degree of control of the rate of deposition.

FIG. 3 illustrates a portion of flexible, plastic substrate 51 having a metallized layer 49 upon one surface, and having a thin layer 48 of solid polymer deposited on the conducting surface by glow discharge polymerization according to the teachings of the invention. A combination substrate of this type offers an advantage over the single layer metallic substrate when fabricating capacitors in that portions of the conducting coating can be removed to provide an insulating subsurface for lead contact.

FIG. 6 illustrates a preferred embodiment of the invention which provides a supporting electrode on the side of each substrate throughout the discharge zone. This embodiment enables the coating of insulating or conducting substrates and enables the use of electrode configurations giving highest efficiency. Furthermore, with this structure thin films may be produced upon substrates which have a tendency to overheat or to curl when in the discharge zone and therefore acquire a non-uniform coating across their widths when in the discharge zone.

In the structure of FIG. 6, elongate, flexible substrates 98 and 100 are supplied from supply spools 102 and 104 and recovered on take-up spools 106 and 108, respectively. Between the supply and take-up spools, each of the substrates 98 and 100 passes over its respective central roller 110 or 112 in such a way as to expose the surfaces to be coated to each other in the discharge gap. Rollers 110 and 112 may be spaced apart to produce a point of minimum separation between the opposing substrate surfaces which is of the order of 0.25 inch. The axes of cylindrical rollers 110 and 112 are maintained parallel to one another by means of spindles (not shown) journalled in backing plate 114, thereby maintaining the widths of the substrates parallel to each other in the discharge zone. Provision is made for supplying a coolant to the interior surfaces of rollers or drums 110, 112 by means of pipes 111, 113 which feed the coolant axially as through a hollow, perforate spindle, to the interior of the drums. The coolant may be exhausted through backing plate 114 through the mounting spindle, as will be readily understood by those skilled in the art. Electrical connections for supplying electric potential to the exposed substrate surfaces in the discharge zone are made via metal rollers 110 and 112, supplied by means of leads 103, 105 attached to coolant supply tubes 111, 113 respectively. Many different types of substrates may be used with this embodiment including those whose electrical conductivity is low (insulators), intermediate (semiconductors) or high. When an insulating plastic substrate or an insulating plastic having a conducting surface is used, the required discharge-sustaining potential difference between the exposed surfaces of the substrates may be obtained by means of a high frequency alternating voltage applied between rollers 110 and 112 and capacity coupled therefrom through the plastic substrate to the exposed dielectric surfaces.

A portion of non-conducting substrate 156 having film 158 glow discharge polymerized thereon such as may be produced in the apparatus of FIG. 6 is illustrated in FIG. 6*a*.

The graph of FIG. 7 shows how advantage is gained in the embodiment of FIG. 6 through its ability to operate at higher pressures than structures employing parallel plane electrodes. The data plotted was taken on the fixed electrode system schematically illustrated in FIG. 7*a*, using two semicylindrical convex-facing electrodes each of which had a 3" radius and which were spaced apart about 0.25 inch at their points of closest approach. The outer surface of each of these electrodes was covered with a plastic substrate having an exposed, conducting surface. The plastic used was of "Mylar" of 0.00025 inch thickness one surface of which was coated by evaporation with aluminum. The curves of FIG. 7 show the amount of polymer produced along the length of one of the substrates measured from the center of the substrate length, a position corresponding to the point of least separation between the participating surfaces. The polymerizable substance was a monomeric mixture produced by pyrolysis of polytetrafluorethylene and runs were made at three different pressures: the first in a range between 2.8 and 3.0 millimeters (Hg.), the second between 0.8 and 0.9 millimeters (Hg.) and the third between 0.25 and 0.3 millimeters (Hg.). These values were selected to be above, approximately equal to, and below the Paschen minimum for the chosen electrode spacing and gas; i.e. that pressure at which the voltage required to sustain a discharge is at a minimum. The semicylindrical supporting electrodes were supplied with voltages of about 350 v., 300 v. and 310 v., respectively, at a frequency of 200 kc. At currents of 85 ma., 50 ma., and 20 ma. for the three pressures, the films having the thickness distributions shown were produced in operating times of 0.75 minutes, 4 minutes, and 8 minutes, respectively. The relative performance of the three operating pressures may be judged by the deposition efficiency index figures of 0.65, 0.3 and 0.2 for the high, middle, and low pressure runs, respectively, obtained by taking the quotient of deposited volume (in micron-inches for constant film width) by the charge supplied. Charge supplied was calculated from the product of input current in milliamperes and time in minutes. The films produced during these runs all had resistivities suitable for use as dielectrics in capacitors, with the resistivity of the film produced by the run having highest current density being about $10^{17}$ ohm-centimeters.

The glow discharge between the electrodes had the character shown in FIGS. 8, 9 and 10 during these runs. For the sake of illustration, true proportions were not used. FIG. 9, in which the operating pressure is at or very near to the Paschen minimum, shows two bands of visible glow along the substrate surfaces which overlap in the region of minimum electrode seperation and take the form of an X, or of two crescents, back to back, and touching. If a greater minimum interelectrode separation is used, the glow regions do not meet in the center, but would appear as two crescents, back to back, and spaced apart. FIG. 10, taken at a pressure below the Paschen minimum, shows the dark space which occurs when portions of the electrode surfaces are spaced apart by a distance which is less than the effective mean free path required to maintain an ionized, conductive path and in which the discharge and the principle deposition of film therefore occurs at points of increased electrode separation. The deposition of some film in the central dark region (see FIG. 7) is apparently due to diffusion from the active discharge region. Again, if a wider minimum electrode separation is used, the glow regions will not come together at an apex to form a V like structure, but will be separated at their point of nearest approach. FIG. 8 shows the more local form of discharge which occurs at a pressure somewhat above the minimum of the Paschen curve. Here the discharge was narrow, confining itself to the region of minimum electrode separation. With parallel plane electrodes having constant separation no stable discharge could be maintained at this high pressure because of contraction of the discharge to a narrow channel which moved irregularly over the entire area. With the varied electrode separation, however, the high pressure discharge seeks the minimum electrode separation, becoming fixed in the longitudinal direction of motion, and a stable, high efficiency discharge occurs. Increasing the voltage had the effect of enlarging the active discharge somewhat into regions of increased electrode separation. The most effective factors in controlling glow discharge distribution in all cases were pressure and the varied separation of the surfaces.

When pressures higher than those discussed above were employed in the apparatus of FIG. 6*a*, the width of the discharge became less than that required to simultaneously cover the one inch width of the substrates employed. However the build-up of film evens out under these coniditions due to the behavior of the discharge in preferentially seeking those regions of the discharge-supporting surface which offer the lowest impedance to the flow of gas discharge conduction current.

The pressure of the gaseous substance supplied to the discharge cannot be increased indefinitely, however, because of the production of molecules of higher and higher weights in the interelectrode space. These higher weight substances, are not transported to the substrate surfaces in forms capable of further polymerization into a solid, continuous homogeneous polymer film; indeed, if they do arrive at the substrate surfaces, they merely form a non-adherent, flocculent coating.

When producing polymer films by glow discharge polymerization, the temperature of the deposited film and of the substrate is raised considerably by the action of the discharge. When metal substrates are used, this fact is of little consequence until temperatures capable of decomposing the deposited film are attained. With perfluorocarbons, these temperatures can be of the order of several hundred degrees centigrade. With other substances, lower temperature limits must be observed. When plastic substrates are used, the nature of the plastic will determine the safe operating temperature which can be used. In all cases, the direct removal of heat from the discharge zone by means of forced cooling of the substrate-carrying surfaces will permit operation at significantly higher gas discharge pressures with accompanying increases in efficiency.

The data of FIG. 7 also shows that, in some circumstances, it may be desirable to operate at a pressure below the Paschen minimum in order to obtain the benefit of distribution of local heating effects. For example in the apparatus of FIG. 2, the pressure could be adjusted to cause the discharge to flow only to substrate surfaces in the regions of increased gap length produced by the converying and diverging substrate surfaces. In this way heat occasioned by the first polymerizing discharge in which the substrate surfaces participate will be dissipated by conduction to the first set of rollers over which each substrate then travels and by radiation and convection during passage through the discharge-free zone of minimum substrate separation between the rollers. After being cooled, the substrate will then be able to accept more heat when passing through the second discharge. Similarly, with the structure of FIG. 6, the pressure may be adjusted to distribute the discharge over an area of cooled surface. With the heating effect thus dispersed, substrates and polymer films which are particularly heat sensitive may be subjected in one pass through the discharge to higher total discharge powers, and production thereby accelerated.

FIG. 11 illustrates still another embodiment of the invention in which curved, convex-facing, fixed-plate electrodes are employed to guide a pair of elongate, flexible substrates through the active discharge zone with a more gradual curvature than that of FIG. 6. The tape transport apparatus of FIG. 11 employs a pair of supply spools 120, 122, each of which feeds its respective, flexible substrate 121, 123 to take-up spools 124, 126 in such a way that the exposed surfaces of the substrates gradually approach one another until they pass through a central zone of minimum spacing, and then withdraw from one another as they exit from the central zone. The oppositely disposed, curved, metal backing plates 128 and 130 thus not only provide a structure having controlled variation of the spacing between the substrate surfaces but also provide surfaces over which the substrates can be drawn and maintained flat while being processed. In this illustrative example, each substrate 121, 123 is of the plastic known to the trade as "Mylar" and may be as thin as 0.00025 inch. The exposed surface of each substrate has been previously coated with a thin layer 125, 127 of aluminum in a manner well known to the art. Metal backing plates 128, 130 serve as convenient heat sinks which may be cooled to remove heat from the substrate during its passage through the active discharge zone, thus permitting use of higher currents in the polymerizing discharge. To this end, longitudinal passages (not visible) within backing plates 128 and 130 may be connected to a suitable coolant supply system by means of input and output pipe connections 136 and 138 through which a coolant fluid may be supplied and removed. Electric power is applied to the backing plates by leads 140 and 142, the necessary potential difference between the substrate surfaces being produced by capacity coupling through the "Mylar" substrate to the conducting layers thereon.

Motion of the substrates is produced by means of spur gears 144 and 146, driven by worm gears 148, on drive shaft 152. Shaft 152 may be turned at varying speeds by variable speed motor 154 to provide control over the rate of substrate motion through the polymerizing discharge. Drag brake 141 maintains the necessary tension on substrate 121, and a like brake (not shown) maintains the tension on substrate 123.

In this embodiment of the invention, the radius of curvature of guide plates 128 and 130 and the spacing between them at their point of nearest approach is selected to give an active discharge zone length compatible with the required residence time of the substrates being coated, taking into consideration the maximum discharge current which may be supplied and the maximum acceptable substrate temperature with the coolant system operating. Since the plates are curved, the apparatus may be operated either above or below the minimum Paschen pressure and the discharge will be fixed in place by the region of minimum substrate surface separation. As previously indicated, the preferred mode of operation, with materials, is at the higher pressures.

With the exception of details discussed previously, operation of the structures of FIGS. 1 and 2, 2*a*, 6 and 11 is essentially the same. The configuration of the glow discharge region and mode is established by controlling the paths travelled by the substrates. Once having shaped the paths, the supply spools are loaded with the appropriate, rolled substrate and each substrate is guided over the paths established by the idler roller, rollers, or fixed guides to the appropriate take-up spool. With the transporting apparatus thus provided with the material to be coated, bell jar 6 is placed in position on base plate 2 and the enclosure evacuated by means of vacuum pump 22. Valve 20 is then throttled down and valve 24 opened to admit the gaseous, glow-discharge polymerizable substance from supply container 26 to the space within the bell jar. Obviously valve 20 could be replaced by two valves connected to the vacuum line, one for rapid initial exhaust of the atmosphere in chamber 6 and the other for exhausting any residual monomer gases at a lower, finely controlled rate. Many gaseous, polymerizable substances have been found useful in fabricating ploymer dielectric films using glow-discharge polymerization including gaseous styrene, tetrafluorethylene, benzene, silicon tetrafluoride, dimethyl silicone, demethyldichlorsilane, etc. Many other materials may, of course, be used, particularly when the better dielectric characteristics are not essential to the product. By means of pressure gauge 19 and vacuum pump control valve 20, the pressure within bell jar 6 is regulated to the level which has been experimentally predetermined to be most effective for maintenance of the desired type of discharge with the starting materials employed. The ionizing voltage is supplied to the surfaces of the substrates participating in the discharge by means of power supply 36. While power supply 36 may supply either D.C. or A.C., many materials are difficult to polymerize with D.C., and the use of alternating current of an elevated frequency is preferred. Where coupling through the capacitance of the substrates is employed to supply the necessary potential difference to the substrate surfaces, the frequency should be high enough to minimize losses in the substrates. The output of the power supply is then adjusted to set the discharge current at the desired level. Since the acceptable discharge current is a function of many variables, including the geometry of the structures employed, optimum operating conditions for a particular apparatus must be determined by experiment for each gaseous polymerizable substance and for substrates of significantly different character. Factors affecting the amount of current which may be used are the undesirable conditions of sparking at the substrate surfaces, tolerable degradation of the deposited polymer, acceptable waste of gaseous polymerizable substance due to the production of unused polymers in the volume between the substrate surfaces instead of on the surfaces, the area of substrate surface within the effective discharge zone, the rate of movement of the substrate surfaces through the discharge zone, the vapor pressure of the gaseous polymerizable substance, and the temperature to which the substrate may be exposed.

With the discharge initiated and controlled to produce the desired discharge conditions, the transport drive motor may then be activated to move the substrates through the active discharge zone at a rate which yields the desired coating thickness. As the gaseous raw material is consumed in the discharge, more material is supplied continuously or intermittently through valve 24.

FIGS. 12, 13 and 14 are profile views of alternate embodiments of the invention showing still other significant features.

In the embodiment of FIG. 12, advantage is taken of the large surface areas available upon a roller, or rotating drum, to provide support for each substrate along a substantial portion of its length both before and after it is subjected to the action of the glow discharge. In this way, the existence of unsupported lengths of substrate is minimized, thereby avoiding mechanical damage to the more sensitive types of materials, while at the same time affording support and maximum cooling of the substrate while in the discharge zone. Maximum cooling is obtained by causing each substrate to remain in engagement with its cooling surface for as long a time as possible. Thus, substrate 160 is supplied from spool 162 in such a fashion that, when the radius of the supply spool is least, as at the end of a production run, substrate 160 is tangent to drum 164 at a point well in advance of the glow discharge region established by the closest points of approach of drums 164 and 166. Similarly, substrate 160 departs the surface of drum 164 at the point on the circumference of the drum which is well beyond the glow discharge region. Take-up spool 168 is therefore placed on the opposite side of drum 164 from the glow discharge so as to maximize the period of time which substrate 160 spends in contact with drum 164 after glow discharge polymerization has been accomplished. The feed and recovery of substrate 170 from supply and take-up spools 172 and 174, respectively, is accomplished in the same way as just described for substrate 160, thereby accomplishing the same purpose. Cooling of drums 164 and 166 is accomplished by the supply of a suitable coolant to each drum in a manner well known in the art and removed therefrom, for example, by means of pivoted central tubular connections 175, 177 attached to the axis of each drum.

In order to avoid the application of undesirable tension to the substrates during processing, it is desirable, when handling substrates which may stretch, to drive not only the take-up spools 168 and 174, but also to drive drums 164 and 166. Since the angular velocities of the supply and take-up spools are a function of the amount of substrate they carry at any given time, it is preferred to drive drums 164 and 166 at a constant rate and to provide variable speed drives for maintaining constant peripheral velocities of the supply and take-up spools, as will be understood by those skilled in the art.

Electrical connection for supplying the polymerizing voltage to drums 164 and 166 may be made by means of connecting leads 176 and 178, respectively, connected to cooling pipes 175 and 177. In the case of solid metal substrates, connection between the substrate surface and the drum would be made directly by means of the metal in the substrate, whereas in the case of metal coated plastic substrates or simple non-conducting plastic substrates, the necessary potential difference between the exposed surfaces may be achieved by capacity coupling as described above in the description of FIG. 6.

FIG. 13 illustrates still another embodiment of the invention in which polymerization of film upon insulating or conducting surfaces of a pair of moving substrates is accomplished by passing the substrate through a sequence of glow discharge zones. This structure is well adapted for expansion to provide any desired thickness of deposited films by multiplication of components to provide for any desired number of sequential polymerizing discharges.

In the apparatus of FIG. 13, close spacings between the substrate surfaces being acted upon are provided between successive pairs of electrified rollers or drums, the first pair being designated 220, 222 and the second pair being designated 224, 226. The spacings between the rollers of each pair is maintained constant in a direction transverse to the direction of motion of the substrates to ensure uniformity of the deposition of film across the width of the substrates. Each substrate 228, 230 is supplied from its respective supply spool 232, 234 which may, conveniently, be located to the rear of the drum with which it is associated and thus placed away from the glow discharge region, so that each substrate spends, preferably, more than 180 degrees in contact with its drum surface. After passing over the first pair of drum surfaces, the substrates pass over reversing rollers 236, 238 to the surfaces of the second set of electrified drums 224, 226. Reversing drums 236, 238 may be of metal such as aluminum but the surfaces in contact with the deposited film should be smooth and free of scratches. A plastic cotating is satisfactory for the purpose. The diameters and the location of the reversing drums are chosen to provide minimum gaps for unsupported travel of the substrates between the rollers while avoiding the flow of discharge currents between the exposed surfaces of the reversing drums. Substrates 228 and 230 are recovered on take-up spools 240 and 242 after passing through the second discharge zone between the second pair of electrified drums 224, 226. As with the structures of FIGS. 6, 13 and 14, substrate-carrying rollers or drums 220—226 are supplied with a coolant by axially connected pipes 243, 245, 247 and 249 to permit operation at higher current densities without damage to the substrates. If necessary, idler or reversing rollers 236, 238 may also be cooled. Like the embodiments of FIGS. 2, 2*a*, 6 and 12, tension sensitive substrates may be protected against stretching by driving all rotating elements at speeds which will result in constant peripheral velocities so as to remove tension from the substrates. Electrical power for energizing the substrate surfaces between each pair of rollers 220, 222 and 224, 226, is supplied by means of electrical leads 244, 246, 248 and 250, all of which are electrically connected to their respective rollers by means of coolant tubing 243, 245, 247 and 249. For simplicity of power supply circuitry, connecting leads 244 and 246 may be connected to one input terminal from the power supply and connecting leads 248, 250 may be connected to the other. A series of drums of this type, each having a rapid convergence and divergence in the discharge zone take advantage of the high efficiency, high pressure discharge and enable a high production rate capability.

Glow discharge polymerization with the structures of FIGS. 12 and 13 may be conducted inside of the evacuated chamber disclosed in FIG. 1 in the manner more fully described above following the description of FIG. 11.

The number of successive polymerizations which may be performed in an apparatus of the type shown in FIG. 13 is dependent only upon the number of successive glow discharge regions established by the apparatus, and the ultimate thickness of the finished product depends upon amount of polymer which can be deposited in each zone and the number of polymer layers so produced.

FIG. 14 discloses another embodiment of the invention in which a pair of substrates, processed in an apparatus essentially like that of FIG. 6 and having the character shown in FIG. 6*a*, are subsequently passed through a body of solvent for removal of the supporting substrate.

In the apparatus of FIG. 14, a flexible substrate, such as 0.00025 inch polyethylene terephthalate is wound onto two spools 256 and 258 for supplying substrates 252, 254 to the surfaces of rollers 260, 262. After engaging and passing between the opposed surfaces of rollers 260, 262 where the polymerizing glow discharge is maintained, substrates 252 and 254 are guided into a body of solvent 264 which is maintained in tank 266. In order to insure passage of substrate 252 along a divergent path away from substrate 254 after departing from rollers 260, substrate 252 is passed over idler roller 280 which serves both to reverse its direction of travel for convenient entry into solvent bath 266 and to insure that the desired substrate path is established in and after the discharge zone. The bath in which the "Mylar" substrate is dissolved may comprise any convenient solvent which will remove Mylar without significantly disturbing the composition of the deposited film. When the deposited film is a perfluorocarbon which resists attacks by most common solvents, the choice of solvent is fairly broad, solvents such as hot tricresylphosphate, benzyl alcohol at 320° F., cresol, etc., having been found useful. When films of other material are to be separated, a substrate is chosen which may be dissolved in a solvent which is incapable of dissolving the particular film deposited. Thus, ordinary polystyrene or polyethylene may be used as substrates for perfluorocarbon films or for glow-discharge polymerized, cross-linked styrene and the substrates dissolved in toluene.

During passage through the solvent, the film coated substrates 252, 254 are passed over guide rollers 268, 270 and 272, 274, respectively. After separation and removal of the Mylar substrates in the solvent, the gas discharge polymerized films, now free of substrate, are separately withdrawn and recovered on take-up spools 276, 278. Because of the fragile nature of the separated films which may be as thin as one micron, adjustment of the film handling equipment to prevent the application of undue tensions to the separated material is necessary. To this end, supporting rollers 260, 268, 272 and 274 and take-up spools 276, 278 must all be driven (by apparatus not shown) and their relative speeds carefully adjusted to avoid placing unnecessary tension upon the film.

Because of the likelihood of intermixture of the gaseous, polymerizable substance and of vapors emitted by the solvent, with consequent and usually undesirable effects upon the composition of the glow-discharge polymer films reduced, the apparatus of FIG. 14 is fitted with a vapor barrier for preventing passage of significant quantities of vapor into the discharge region. As shown, the barrier is simply a vapor resistant member 286 equipped with suitably gasketed ports 288, 290 through which substrates 252, 254 pass from the discharge-containing portion of the enclosure to the stripping portion. The edges of the barrier are also gasketed, 292, to provide a vapor-flow-preventing seal between the rim of barrier 286 and the mating surfaces of the hermetic enclosure (not shown) in which the apparatus is operated.

Obviously other polymerizer structures such as that shown in FIG. 13, may be substituted for that shown in FIG. 14, and the resulting polymer film product separated from its substrate.

It will be understood that the above described embodiments of the invention have wide application. A wide range of gaseous substances is suitable for glow discharge polymerization of thin films and a wide range of substrates may receive the films. For example, in addition to the gaseous substances which are useful in producing high quality dielectrics having high insulation resistances and low power factors, as described above, many other materials may be used which have utility for many other purposes. For example a silicon-containing material such as a silicone, may be used to supply a surface having good water repellent characteristics to a metal or plastic which originally did not have this character. Similarly, a perfluorocarbon, such as polytetrafluorethylene may be applied to a metal or plastic surface in order to protect that surface against attack by chemicals to which the perfluorocarbon is inert.

Also, while emphasis has been placed in the above descriptions on the production of films of uniform thickness for use in electrical applications where constant thickness is desirable, it will be apparent to those skilled in the art that films having controlled variations in thickness may also be produced by suitable modifications of the invention. For example, a tapered variation in film thickness may be produced by slanting the width of the substrate surfaces toward each other in the discharge zone.

In addition, it will be apparent that the basic teachings of the invention may be utilized in structures adapted to the production of coatings on both sides of a substrate, such as by means of a second pass through a discharge zone with the substrate reversed, or by means of separate glow discharges spaced along the path of moving substrate on opposite sides of the substrate.

In the interests of brevity, various features have been illustrated and described in connection with only one illustrative embodiment of the invention. It is intended that these features may be used in combination with features shown in other embodiments without departing from the spirit of the invention.

The below appended claims should therefore be granted interpretation in keeping with the spirit of the invention rather than limited to the specific, illustrative embodiments specifically disclosed herein.

I claim:

1. In the method of glow discharge polymerization in which gaseous material to be polymerized is introduced into a reaction region and particles thereof under the influence of a glow discharge are deposited upon a member and there polymerized to form a film, the steps of advancing the surface of said member along a path extending spaced across a glow discharge zone from an electrode while progressively varying the separation between said path and said electrode across said glow discharge zone so that the separation between said electrode and each successive portion of said surface decreases and subsequently increases as each of said portions passes through said glow discharge zone, introducing a polymerizable gaseous material into said glow discharge zone, applying a glow-discharge-sustaining potential to said electrode with respect to said surface, and selectively positioning the glow discharge along said surface by controlling said potential and the value of the product of the pressure of said gaseous material by said separation.

2. In the method of glow discharge polymerization in which gaseous material to be polymerized is introduced into a reaction region and particles thereof under the influence of a glow discharge are deposited upon a member and there polymerized to form a film, the steps of advancing the surface of said member along a path extending spaced across a glow discharge zone from an electrode while progressively varying the separation between said path and said electrode across said glow discharge zone so that the separation between said electrode and each successive portion of said surface decreases and subsequently increases as each of said portions passes through said glow discharge zone, introducing a polymerizable gaseous material into said glow discharge zone, applying a glow-discharge-sustaining potential to said electrode with respect to said surface, and selectively positioning the glow discharge along said surface by controlling the pressure of said gaseous material and said potential.

3. In the method of glow discharge polymerization in which gaseous material to be polymerized is introduced into a reaction region and particles thereof under the influence of a glow discharge are deposited upon a member and there polymerized to form a film, the steps of advancing the surface of said member along a path extending spaced across a glow discharge zone from an electrode while progressively varying the separation between said path and said electrode across said glow discharge zone so that the separation between said electrode and each successive portion of said surface decreases and subsequently increases as each of said portions passes through said glow discharge zone, introducing a polymerizable gaseous material into said glow discharge zone, applying a glow-discharge-sustaining potential to said electrode with respect to said surface, selectively positioning the glow discharge along said surface by controlling the pressure of said gaseous material and said potential thereby to form a film of polymerized material on said surface, and thereafter removing the polymerized material from said surface.

4. In the method of glow discharge polymerization in which gaseous material to be polymerized is introduced into a reaction region and particles thereof under the influence of a glow discharge are deposited upon a member and there polymerized to form a film, the steps of advancing the surface of said member along a path extending spaced across a glow discharge zone from an electrode while progressively varying the separation between said path and said electrode across said glow discharge zone so that the separation between said electrode and each successive portion of said surface decreases and subsequently increases as each of said portions passes through said glow discharge zone, introducing a polymerizable gaseous material into said glow discharge zone, applying a glow-discharge-sustaining potential to said electrode with respect to said surface, selectively positioning the glow discharge along said surface by adjusting the pressure of said gaseous material in said glow discharge zone in relation to said potential and the minimum separation between said member and electrode within a range extending from a value greater than to a value less than the Paschen minimum but less than a value at which sparking occurs between said member and said electrode.

5. In the method of glow discharge polymerization in which gaseous material to be polymerized is introduced into a reaction region and the particles thereof under the influence of a glow discharge are deposited upon a member and there polymerized to form a film, the steps of advancing the surfaces of two members along the curvilinear paths in opposing spaced apart relationship, the curvature of said paths relative to one another being characterized by a decreasing separation between said members followed by an increasing separation, introducing a polymerizable gaseous substance into the space between said opposing surfaces, establishing a glow-discharge-sustaining potential difference between said opposing surfaces, and selectively positioning the glow discharge along said surfaces by controlling the pressure of said gaseous substance and the potential between said surfaces.

6. In the method of glow discharge polymerization in which gaseous material to be polymerized is introduced into a reaction region and the particles thereof under the influence of a glow discharge are deposited upon a member and there polymerized to form a film, the steps of advancing the surfaces of two members along curvilinear paths in opposing, spaced apart relationship, the curvature of said paths relative to one another being characterized by a decreasing separation between said members followed by an increasing separation, introducing a polymerizable gaseous substance into the space between said opposing surfaces, establishing a glow-discharge-sustaining potential difference between said opposing surfaces, selectively positioning the glow discharge along said surfaces by controlling the pressure of said gaseous substance and the potential between said surfaces thereby to form a film of the polymerized substance on both of said surfaces, and thereafter removing the polymerized material from said surfaces.

7. In the method of glow discharge polymerization in which gaseous material to be polymerized is introduced into a reaction region and the particles thereof under the influence of a glow discharge are deposited upon a member and there polymerized to form a film, the steps of advancing the surfaces of two members along curvilinear paths in opposing spaced apart relationship, the curvature of said paths relative to one another being characterized by a decreasing separation between said members followed by an increasing separation, introducing a polymerizable gaseous substance into the space between said opposing surfaces, establishing a glow-discharge-sustaining potential difference between said opposing surfaces, selectively positioning the glow discharge along said surfaces by controlling the pressure of said gaseous material in said space in relation to said potential and the minimum separation between said members within a range extending from a value greater than to a value less than the Paschen minimum but less than the value at which sparking occurs between said members.

8. Glow discharge polymerization apparatus, comprising means defining a reaction region including an electrode, a member and means for advancing at least successive portions of the surface of said member in said reaction region spaced from said electrode along a path characterized by decreasing separation from said electrode followed by increasing separation from said electrode, means for introducing a polymerizable gaseous material into the space between said electrode and said member, means for applying a glow-discharge-sustaining potential to said electrode with respect to said member, and means for selectively positioning the glow discharge along the surface of said member including means for controlling the pressure of said gaseous material in said space and said potential, whereby to polymerize said material on said surface.

9. An apparatus as set forth in claim 8 which comprises means for separating the polymerized material from said member.

10. Glow discharge polymerization apparatus, comprising means defining a reaction region including a first electrode, a second electrode and means for advancing in said reaction region at least the surface portion of said second electrode along a path characterized by decreasing separation from said first electrode followed by increasing separation from said first electrode, means for introducing a polymerizable gaseous material into the space between said electrodes, means for applying a glow discharge sustaining potential between said electrodes, and means for selectively positioning the glow discharge along said surface portion of said second electrode including means for controlling the pressure of said gaseous material in said space and said potential, whereby to polymerize said material on said surface.

11. Glow discharge polymerization apparatus, comprising means defining a reaction region including a first electrode, a second electrode in opposed spaced relation to said first electrode, a dielectric member engaging the surface of said second electrode presented toward said first electrode, means for advancing said dielectric member and at least the surface portion of said second electrode engaged thereby along a path in said reaction region characterized by decreasing separation from said first electrode followed by increasing separation from said first electrode, means for introducing a polymerizable gaseous material into the space between said electrodes, means for applying a glow discharge sustaining potential between said electrodes, and means for selectively positioning the glow discharge along said surface portion of said second electrode including means for controlling the pressure of said gaseous material in said space and said potential, whereby to polymerize said material on said dielectric member.

12. Glow discharge polymerization apparatus, comprising means defining a reaction region including a pair of opposed spaced apart electrodes, a pair of substrates, means for advancing each of said substrates along a respective one of said electrodes in electrically coupled relation therewith, said electrodes defining paths for said substrates such that the separation between oppositely disposed portions of said substrates first decreases and then increases as the same are advanced along said paths, means for introducing a gaseous polymerizable material into the space between said substrates, means for establishing a glow-discharge-sustaining potential difference between the opposed portions of said substrates along said paths including means for applying a voltage between said electrodes, and means for selectively positioning the glow discharge along the opposed portions of said substrates including means for controlling the pressure of said gaseous material in the space between said substrates and said potential.

13. Glow discharge polymerization apparatus, comprising a pair of opposed, spaced apart glow-discharge-region-defining rollers, means for rotating each of said rollers about its axis, means for introducing a gaseous polymerizable material into the space between said rollers, means for establishing a glow-discharge-sustaining potential difference between the opposed surfaces of said rollers to form films of polymerized material supported by each of said rollers, means for selectively positioning the glow discharge along the opposed portions of said rollers including means for controlling the pressure of said gaseous material in the space between said rollers and said potential, and means for removing said polymerized material from said rollers.

14. Apparatus for forming a polymer film upon the surfaces of a pair of elongate substrates by glow discharge polymerization including a first and a second pair of opposed discharge-region-defining rollers, the rollers of each pair being spaced apart so as to define a first discharge region between said first pair and a second discharge region between said second pair, a pair of substrate supply spools, a pair of take-up spools, a pair of guide rollers at stations intermediate said discharge-region-defining rollers, means advancing said pair of substrates along paths from said supply rolls between and partially around said first pair of discharge-region-defining rollers, outside said guide rollers, thence between and partially around said second pair of discharge-region-defining rollers, and thence around said take-up spools, a source of high-frequency alternating voltage, means coupling said source to said discharge-region-defining rollers and thereby to the opposed surfaces of said substrates, means forming a chamber enclosing said rollers, a source of supply of a gaseous polymerizable film-forming substance connected to said chamber, a first control valve for controlling the rate of flow of said substance into said chamber, evacuating means connected to said chamber, a second control valve for controlling the effect on said chamber of said evacuating means, for maintaining a subatmospheric pressure in said chamber, said voltage being of such a value as to produce glow discharges in said successive discharge regions so as to form successive layers of polymerized film from said gaseous substance directly on each of said substrates in each of said successive discharge regions, and means for cooling said discharge-defining rollers to prevent overheating of said film.

References Cited in the file of this patent

UNITED STATES PATENTS

| | | |
|---|---|---|
| 2,496,911 | Green | Feb. 7, 1950 |
| 2,500,728 | Williams | Mar. 14, 1950 |
| 2,520,173 | Sanders | Aug. 29, 1950 |
| 2,551,035 | Miller | May 1, 1951 |
| 2,590,186 | Land | Mar. 25, 1952 |
| 2,676,145 | Weisz et al. | Apr. 20, 1954 |
| 2,864,756 | Rothacker | Dec. 16, 1958 |
| 2,932,591 | Goodman | Apr. 12, 1960 |